Oct. 6, 1970   A. G. DEAN   3,531,896
SLIDING DOOR
Filed March 3, 1969
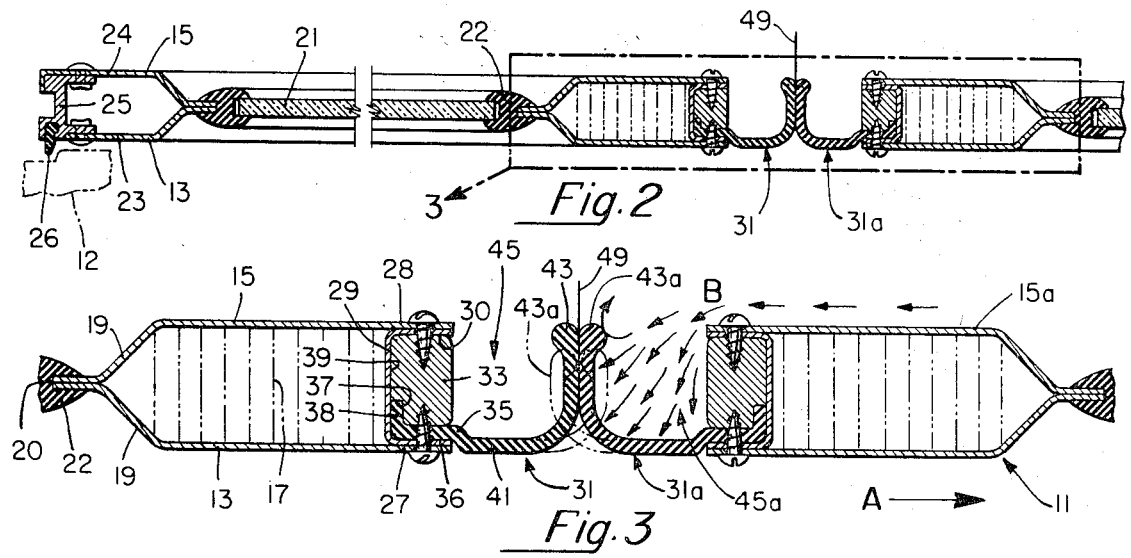
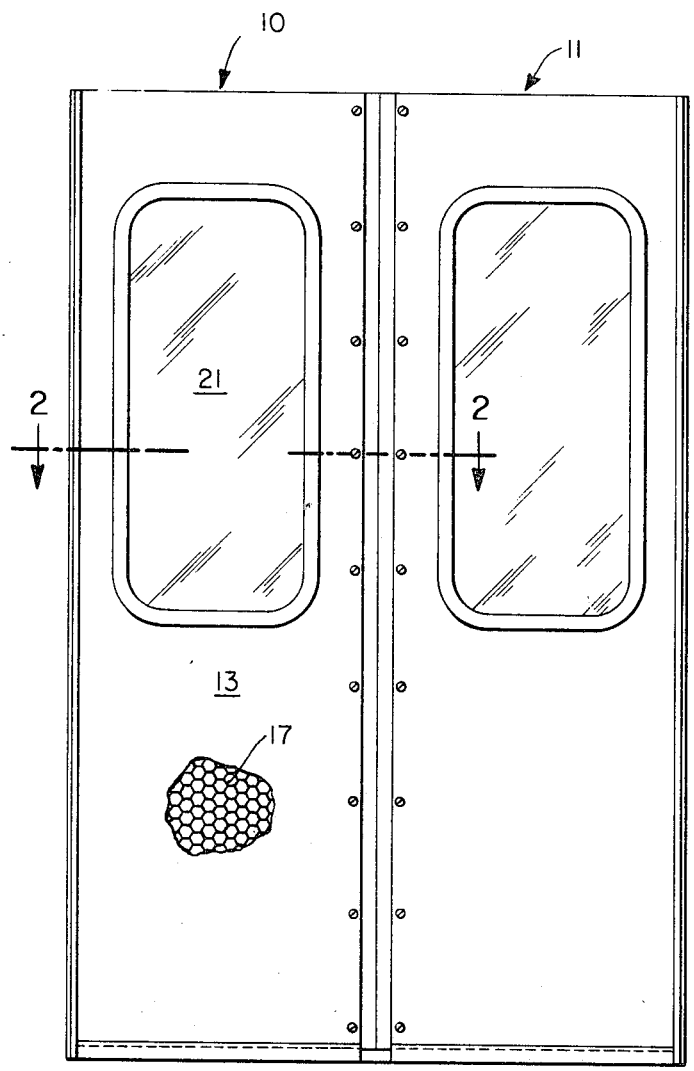
INVENTOR.
ALBERT G. DEAN
BY
William R. Nolte
AGENT United States Patent Office 3,531,896
Patented Oct. 6, 1970

3,531,896
SLIDING DOOR
Albert G. Dean, Narberth, Pa., assignor to The Budd Company, Philadelphia, Pa., a corporation of Pennsylvania
Filed Mar. 3, 1969, Ser. No. 803,766
Int. Cl. E06b 7/23
U.S. Cl. 49—488                3 Claims

ABSTRACT OF THE DISCLOSURE

A railway passenger car sliding door equipped with a resilient guard along its forward edge. The guard includes a free end spaced from the supporting structure of the door to create a recess into which water and debris striking the side of the vehicle are caused to enter.

---

Heretofore, side entry doors for railway passenger vehicles have been provided with seals and baffles to prevent the leakage of air and debris from reaching the inside of the car. Many of these seals have been of complicated construction and have failed in their objectives when subjected to rain and side wind with the car in forward motion.

It is an object of this invention to provide an improved sliding door construction which avoids one or more of the disadvantages of the prior-art arrangements and which has an improved sealing efficiency.

It is a further object of this invention to provide a sliding door construction having a sealing member which with its supporting structure defines a gutter-like cavity into which rain water and debris striking the side of the vehicle are drawn while the vehicle is in motion.

In accordance with the invention, the sliding door comprises spaced apart inner and outer skins and a sealing strip having one of its edge portions gripped by means between the forward marginal edges of said inner and outer skins. The sealing strip includes an intermediate portion which extends parallel and beyond the forward marginal edge of the inner skin and a free end portion which extends outward in spaced relationship from the forward marginal edge of the outer skin.

For a better understanding of the present invention, together with other and further objects thereof, reference is had to the following description taken in connection with the accompanying drawing and its scope will be pointed out in the appended claims.

In the drawing:
FIG. 1 is an elevation view looking outboard from within a vehicle of a door construction in accordance with the teachings of this inventioin;
FIG. 2 is an enlarged fragmentary sectional view taken along the line 2—2 of FIG. 1;
FIG. 3 is a greatly enlarged view of a portion of the view indicated in FIG. 2.

Referring now to FIG. 1 numerals 10 and 11 generally designate a pair of sliding doors for a vehicle such as a railway passenger vehicle. The door 10 is shown coacting with a portion of the side frame 12 of a vehicle as indicated in FIG. 2. The doors 10 and 11 are substantially identical to one another and are illustrated in their respective closed positions but each is slidable in a direction away from the other to permit access of passengers therethrough. Each door has an inner skin sheet 13 and an outer skin sheet 15 suitably welded together and which sandwich a honeycomb layer 17 therebetween. The upper central portions of the skin sheets are indented as at 19 and apertured as at 20 to receive a window 21 which is held in place by means of glazing strip 22. The rear margins 23, 24 respectively of sheets 13 and 15 embrace an upright member 25 of H cross-section which in turn is suitably slotted to receive a finger seal 26.

Referring to FIG. 3 and in accordance with the invention, the forward vertical margins 27, 28 of skin sheet 13, 15, respectively are spaced apart to receive an upright channel member 29, which defines an opening 30. A resilient closure strip or guard 31 of elastomer material is held in place to project beyond the forward margins of the door by a vertical insert member 33. The member is of a width slightly less than the width of the opening to enable the rear portion 35 of the guard 31 to be gripped between the flanges 36 of the channel member. The rear face of the insert member 33 is recessed as at 37 to receive the rearmost marginal edge 38 of the guard to lock the same in contact with the web 39 of the channel. The intermediate portion 41 of the guard extends forwardly and in a coplanar relationship with the plane of the inner sheet 30, while the outer free end portion 43 of the guard curves outwardly to terminate in the plane defined by outer skin sheet 15 to define a gutter-like cavity 45.

Still referring to FIG. 3 it is observed that the free end 43 of guard 31 abuts and makes contact with a like free end portion 43a of guard 31a to seal the space between doors 10 and 11 against entry of water, dust and debris. With the vericle traveling in the direction as indicated by the arrow A, rain striking the outer face 15a of door 11 for example would be caused to move in the direction indicated by the arrows at B to enter the cavity 45a. The water striking the free end 43a of the guard would run down its inner open face 47. Thus much of the side surface water travelling along the outer door surfaces would be prevented from reaching the abutting sealing surfaces 49 of the free ends 43, 43a of respective guards 31, 31a.

It will be noted that when door 10 for example is in its closed position as illustrated the free end 43 of the guard 31 is in a slightly sprung or flexed position to achieve a tight sealing engagement along surface 49. Thus if door 11 were opened independently of door 10 with the latter door remaining in its closed position the free end portion 43 of the guard would relax or spring back from the full line position shown to its phantom line position.

While there has been described what at present is considered to be the preferred embodiment of this invention, it will be obvious to those skilled in the art that various changes and modifications may be made therein without departing from the invention, and it is therefore aimed in the appended claims to cover all such changes and modifications as fall within the true spirit of the inventioin.

What is claimed is:
1. In a sliding door for a moving vehicle, said door lying in a plane parallel to the axis of said vehicle corresponding to the direction of motion of said vehicle, said door having inner and outer skin members spaced apart at their forward marginal edges, a resilient sealing guard having a first portion thereof secured between said forward marginal edges, an intermediate portion parallel with said inner skin member and extending in a longitudinal direction beyond the forward marginal edge of the outer skin member, and a free end portion contiguous with said intermediate portion and extending laterally outwardly to terminate opposite the forward marginal edge of the outer skin member to define a gutter-like recess with the forward marginal edges of said skin members, whereby water and debris striking the outer skin member upon motion of said vehicle along its axis is caused to be drawn into said gutter-like recess.

2. In the sliding door construction as set forth in claim 1 wherein an insert member engages said first portion of said resilient guard, and wherein said insert member is secured between said forward marginal edges of said inner and outer skin members.

2. In the sliding door construction as set forth in claim 2 wherein said insert member includes a rear surface, a cutout portion therein adjacent said inner member, and wherein said first portion of said resilient guard includes a marginal edge thereof which is received within said cutout portion.

References Cited

UNITED STATES PATENTS

| | | | |
|---|---|---|---|
| 2,737,781 | 3/1956 | Gelfand et al. | 49—370 X |
| 3,161,925 | 12/1964 | Bertolini | 49—483 X |
| 3,407,536 | 10/1968 | Nystrom | 49—482 |

DAVID J. WILLIAMOWSKY, Primary Examiner

P. C. KANNAN, Assistant Examiner

U.S. Cl. X.R.

49—483, 493, 496